United States Patent

Okazaki

Patent Number: 5,257,857
Date of Patent: Nov. 2, 1993

[54] ANTISKID BRAKE SYSTEM FOR VEHICLE

[75] Inventor: Haruki Okazaki, Hiroshima, Japan

[73] Assignee: Mazda Motor Corporation, Hiroshima, Japan

[21] Appl. No.: 949,151

[22] Filed: Sep. 23, 1992

[30] Foreign Application Priority Data

Sep. 25, 1991 [JP] Japan .................. 3-245998

[51] Int. Cl.$^5$ .................................. B60T 8/32
[52] U.S. Cl. ........................ 303/103; 188/181 A; 303/106; 303/110; 303/97
[58] Field of Search ............. 303/103, 102, 105, 106, 303/110, 100, 107, 108, 109, 95, 97, 99; 364/426.01, 426.02, 426.03; 188/181 A

[56] References Cited

U.S. PATENT DOCUMENTS

| | | | |
|---|---|---|---|
| 3,847,447 | 11/1974 | Needham et al. | 303/97 |
| 4,193,642 | 3/1980 | Miller | 303/97 |
| 4,384,330 | 5/1983 | Matsuda et al. | 303/97 X |
| 4,392,202 | 7/1983 | Matsuda | 303/109 X |
| 4,414,630 | 11/1983 | Harris et al. | 303/97 X |
| 4,738,492 | 4/1988 | Matsuda | 303/106 |
| 4,933,858 | 6/1990 | Matsuda | 303/97 X |
| 4,997,236 | 3/1991 | Naito et al. | 303/103 X |

*Primary Examiner*—Douglas C. Butler
*Attorney, Agent, or Firm*—Sixbey, Friedman, Leedom & Ferguson

[57] ABSTRACT

In an antiskid brake system for a vehicle, an antiskid control in which the braking pressure to each wheel is reduced and increased so that the wheel speed of the wheel falls at a target deceleration or a target slip ratio is initiated when the deceleration of the wheel speed exceeds an initiation threshold value. The initiation threshold value is reduced when the wheel is kept applied with the braking pressure for a predetermined time.

9 Claims, 4 Drawing Sheets

ANTISKID BRAKE SYSTEM FOR VEHICLE

BACKGROUND OF THE INVENTION

1. Field of the Invention

This invention relates to an antiskid brake system for a vehicle.

2. Description of the Prior Art

In an antiskid brake system for a vehicle, the braking pressures applied to the wheels of the vehicle in response to depression of the brake pedal are controlled so that the wheel speeds are reduced at a target deceleration or at a target slip ratio, thereby preventing lock and skid of the wheels and stopping the vehicle in a short distance with a directional stability. Such an antiskid control is generally initiated when the deceleration of the wheel speed exceeds a predetermined threshold value or the wheel speed falls greatly relative to the vehicle speed.

There have been proposed various antiskid brake systems. For example, in the antiskid brake system disclosed in Japanese Unexamined Patent Publication No. 60(1985)-1061, the braking pressures are reduced as the steering angle increases, thereby improving both the braking efficiency and the driving stability.

When the brake pedal is sharply pushed down, the wheel speed falls at a large deceleration relative to the vehicle until the slip ratio of the wheel reaches a certain value, and then reduction in the wheel speed once slows down. When the brake pedal is further kept depressed, the wheel speed further falls. This is due to the fact that the friction coefficient between the wheel and the road surface becomes maximum when the slip ratio of the wheel reaches 10 to 20%. (See FIG. 2) That is, until the slip ratio becomes 10 to 20%, the wheel speed sharply falls due to small friction and then reduction in the wheel speed once slows down due to large friction when the slip ratio becomes 10 to 20%.

At the time when the wheel speed once slows down, a maximum braking force acts on the wheel and accordingly the antiskid control is not required yet. If the antiskid control is initiated at the time, the braking pressure applied to the wheel is reduced, whereby the slip ratio is reduced and the friction between the wheel and the road surface is reduced. That is, preferably the antiskid control is initiated when the slip ratio is about to increase (i.e., when the friction between the wheel and the road surface is about to decrease).

However, the deceleration of the wheel speed is generally as large as 2.5 G until the slip ratio of the wheel reaches 10 to 20%. Accordingly, in order to prevent the antiskid control until the slip ratio of the wheel reaches 10 to 20%, the threshold value must be as large as, for instance, 3G. However this gives rise to a problem that when the wheel speed further falls after reduction in the wheel speed once slows down, that is, when the antiskid control comes to be required, the antiskid control can be initiated late.

That is, when the threshold value for initiation of the antiskid control is set large, the antiskid control cannot be quickly initiated though premature initiation of the antiskid control in response to sharp depression of the brake pedal can be avoided, and when the threshold value for initiation of the antiskid control is set small, premature initiation of the antiskid control in response to sharp depression of the brake pedal is apt to occur though the antiskid control cannot be quickly initiated.

SUMMARY OF THE INVENTION

In view of the foregoing observations and description, the primary object of the present invention is to provide an antiskid brake system which is free from the aforesaid problem.

The antiskid brake system for a vehicle in accordance with the present invention comprises a hydraulic circuit for applying braking pressure to each wheel of the vehicle in response to depression of a brake pedal, a braking pressure control means which controls the braking pressure applied to each wheel, a wheel speed detecting means which detects the wheel speeds of the wheels, and a control means which begins to cause the braking pressure control means to increase and reduce the braking pressure to each wheel so that the wheel speed of the wheel falls at a target deceleration or a target slip ratio when the deceleration of the wheel speed of the wheel as detected by the wheel speed detecting means exceeds an initiation threshold value and is characterized by having an initiation threshold value changing means which reduces said initiation threshold value when the wheel is kept applied with the braking pressure for a predetermined time.

In the antiskid brake system of the present invention, premature initiation of the antiskid control in response to sharp depression of the brake pedal can be avoided by setting the original initiation threshold value at a large value, and by reducing the initiation threshold value predetermined time after the depression of the brake pedal, the antiskid control can be initiated even if the deceleration of the wheel speed is relatively small.

That is, when the wheel is kept applied with the braking pressure, the slip ratio increases to an extent where the friction between the wheel and the road surface is maximized as described above. When the wheel speed is subsequently further reduced, the wheel is apt to lock even if the deceleration thereof is relatively small. In such a state, it is preferred that the antiskid control is quickly initiated by reducing the initiation threshold value.

In one embodiment of the present invention, the initiation threshold value changing means reduces said initiation threshold value when the wheel is kept applied with the braking pressure and is decelerated at a deceleration smaller than the original initiation threshold value for a predetermined time.

With this arrangement, the initiation threshold value is changed only when the antiskid control has not been initiated and an unnecessary change of the initiation threshold value can be avoided. Deceleration or a target slip ratio when the deceleration of the wheel speed of the wheel as detected by the wheel speed detecting means exceeds a predetermined threshold value.

BRIEF DESCRIPTION OF THE INVENTION

FIG. 1 is a schematic view showing an antiskid brake system in accordance with an embodiment of the present invention, FIG. 2 is a view showing the relation between the slip ratio and the friction coefficient between the road surface and the wheel and the relation between the slip ratio and the lateral drag coefficient, FIG. 3 is a flow chart for illustrating change of the initiation threshold value, and FIG. 4 is a time chart for illustrating the antiskid control.

DESCRIPTION OF THE PREFERRED EMBODIMENT

Figure 1:
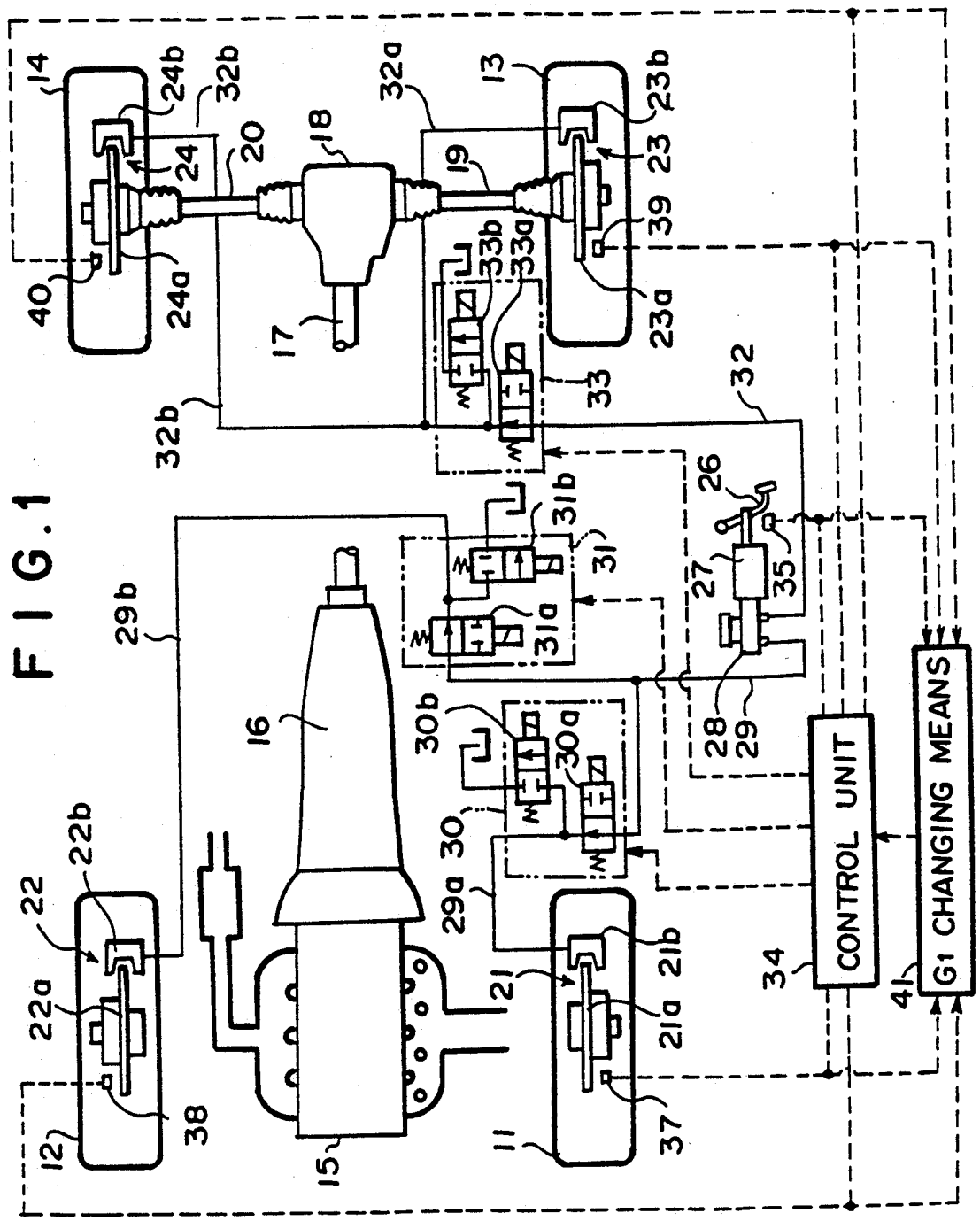

In FIG. 1, a vehicle has left and right front wheels 11 and 12 (driven wheels) and left and right rear wheels 13 and 14 (driving wheels). The output torque of an engine 15 is transmitted to the rear wheels 13 and 14 by way of an automatic transmission 16, a propeller shaft 17, a differential 18 and left and right driving shafts 19 and 20.

The engine 15 is provided with an electronic fuel injection system and a cylinder number control system which cuts fuel supply to one or more of the cylinders when the vehicle is decelerating, thereby improving fuel economy. Further the automatic transmission 16 is provided with a lockup system. The engine 15 is further provided with a bypass intake passage which bypasses the throttle valve and an idle speed control valve is provided in the bypass passage to control the idling speed of the engine.

The wheels 11 to 14 are provided with brakes 21 to 24 comprising disks 21a to 24a and calipers 21b to 24b.

The brake system for operating the brakes 21 to 24 comprises a brake pedal 26, a booster 27 and a master cylinder 28. A front brake line 29 which extends from the master cylinder 28 branches into left and right front brake lines 29a and 29b which are respectively connected to the calipers 21b and 22b of the brakes 21 and 22. A first valve unit 30 comprising an electro-magnetic on-off valve 30a and an electro-magnetic relief valve 30b is provided in the left front brake line 29a and a second valve unit 31 comprising an electro-magnetic on-off valve 31a and an electro-magnetic relief valve 31b is provided in the right front brake line 29b.

A rear brake line 32 which extends from the master cylinder 28 is provided with a third valve unit 33 comprising an electro-magnetic on-off valve 33a and an electro-magnetic relief valve 33b. The rear brake line 32 branches into left and right rear brake lines 32a and 32b, downstream of the third valve unit 33, which are respectively connected to the calipers 23b and 24b of the brakes 23 and 24.

That is, the brake system of this embodiment has a first channel which controls the braking pressure to the brake 21 of the left front wheel 11 by the first valve unit 30, a second channel which controls the braking pressure to the brake 22 of the right front wheel 12 by the second valve unit 31 and a third channel which controls the braking pressure to the brakes 23 and 24 of the left and right rear wheels 13 and 14 by the third valve unit 33. The first to third channels are controlled independently from each other.

The brake system is further provided with a control unit 34 which controls the first to third channels and an initiation threshold value changing means 41 which changes an initiation threshold value for determining whether the antiskid control is to be initiated.

The control unit 34 receives a brake signal from a brake sensor 35 which represents whether the brake pedal 26 has been depressed, wheel speed signals from wheel speed sensors 37 to 40 which respectively detect the wheel speeds of the left and right front wheels 11 and 12 and the left and right rear wheels 13 and 14, and controls the first to third channels independently from each other. That is, the control unit 34 sets a pseudo vehicle speed Vr on the basis of the speeds of the wheels 11 to 14 and determines the deceleration and acceleration of the wheel and the slip ratio thereof. Then the control unit 34 opens and closes the on-off valves 30a, 31a and 33a and the relief valves 30b, 31b and 33b of the first to third valve units 30, 31 and 33 on the basis of the pseudo vehicle speed and the wheel speeds of the wheels 11 to 14, thereby controlling the braking pressures applied to the respective wheels 11 to 14. The brake fluid discharged from the relief valves 30b, 31b and 33b is returned to a reservoir 28a of the master cylinder 28.

The pseudo vehicle speed Vr is set according to the wheel speeds as a temporary vehicle speed since the vehicle speed cannot be precisely detected while the wheels are slipping. That is, in this embodiment, the pseudo vehicle speed Vr is normally set to be the largest of the wheel speeds Vw of the front and rear wheels 11 to 14 (the maximum wheel speed MaxVw), and when the deceleration of the maximum wheel speed MaxVw exceeds a predetermined reference deceleration Dr which is determined as a value from 0.3 G to 1.2 G according to the friction coefficient of the road surface, the pseudo vehicle speed Vr is set to be the value obtained by subtracting the predetermined reference deceleration Dr from the last pseudo vehicle speed Vr as represented by the following formula.

$$Vr \leftarrow Vr - Dr$$

wherein $Dr = 0.3\ G\Delta t \sim 1.2\ G\Delta t$, $\Delta t$ is the sampling cycle of the control unit (e.g., 7 ms) and G is the acceleration of gravity.

The control unit 34 compares the acceleration or deceleration of the wheel or the slip of the wheel with various threshold values and selects one of phase-0, phase-I, phase-II, phase-III and phase-IV. When phase-0 is selected, the antiskid control is not effected. When one of phase-I to phase-IV is selected, the antiskid control is effected. In phase-I, the braking pressure is reduced, in phase-II, the braking pressure is fixed to the reduced value, in phase-III, the braking pressure is rapidly increased from the value fixed in phase-II, and in phase IV, the braking pressure is slowly increased after rapidly increased in phase-III. The phase is selected in each channel independently from the other channels, and the control unit 34 outputs, to the first to third valve units 30, 31 and 33, control signals according to the selected phases.

The control unit 34 sets the following threshold values for each channels independently from the other channels.

Figure 2:
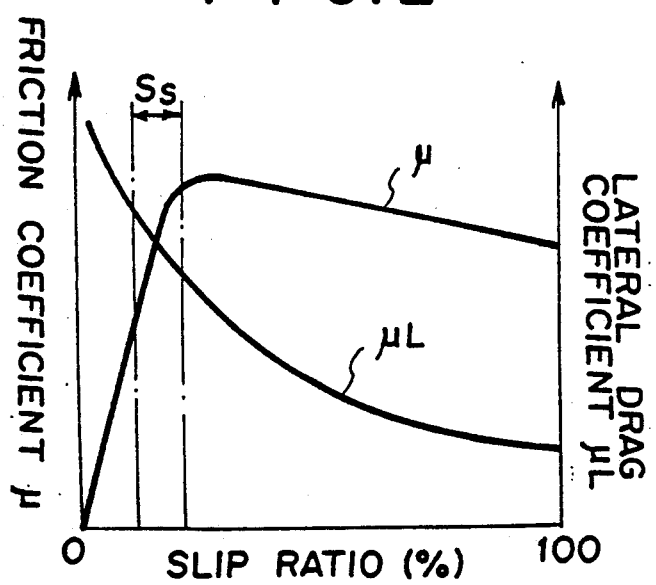

1) antiskid control initiation threshold value G1—for determining shift from phase-0 to phase-I
2) wheel speed deceleration threshold value G2—for determining shift from phase-1 to phase-II
3) first slip ratio threshold value S1—for determining shift from phase-II to phase-III
4) wheel speed acceleration threshold value G3—for determining shift from phase-III to phase-IV
5) second slip ratio threshold value S2—for determining shift from phase-IV to phase-I The threshold values are set so that the friction coefficient $\mu$ between the road surface and the wheel can be maximized without excessively lowering the lateral drag coefficient $\mu L$ as shown in FIG. 2, i.e., so that the friction coefficient $\mu$ and the lateral drag coefficient $\mu L$ fall in the range Ss. That is, when the friction coefficient $\mu$ between the road surface and the wheel is high, a high braking efficiency can be obtained and when the lateral drag coefficient $\mu L$ is high, the running stability during cornering or the driving performance is better. However, as can be understood from FIG. 2, both the friction coefficient μ between the road surface and the wheel and the lateral drag coefficient μL cannot be highest. Accordingly, in the normal antiskid control, the threshold values are set so that they consist with each other.

The friction coefficient of the road surface is determined to be high while the antiskid control is not being effected, and after the antiskid control is initiated, the friction coefficient of the road surface is determined according to the acceleration and deceleration of the wheel speed. That is, when the deceleration is large and the acceleration is small, the friction coefficient is determined to be low, when the deceleration is small and the acceleration is large, the friction coefficient is determined to be high, and otherwise the friction coefficient is determined to be middle.

In this particular embodiment, the antiskid control initiation threshold value G1 is set as a wheel speed deceleration. While the antiskid control is not effected, the control unit 34 sets the initiation threshold value G1 to a higher value G1H (e.g., 3 G) and changes to a lower value G1L in response to command of the initiation threshold value changing means 41.

The deceleration and acceleration of the wheel speed are obtained by dividing the difference between the present value and the last value of the wheel speed by the sampling cycle Δt and converting the result to acceleration of gravity. The lower of the left rear wheel speed and the right rear wheel speed is adopted as the rear wheel speed. The slip ratio is calculated according to the following formula.

slip ratio=(1-wheel speed/pseudo vehicle speed)×100

The initiation threshold value changing means 41 determines whether the initiation threshold value G1 is to be changed on the basis of the brake signal from the brake sensor 35 and the wheel speed signals from the wheel speed sensors 37 to 40. That is, when the wheel is kept applied with the braking pressure (i.e., the brake pedal 26 is kept depressed) and is decelerated at a deceleration smaller than the higher initiation threshold value G1H for a predetermined time T (e.g., 70 ms), the initiation threshold value changing means 41 outputs a command signal which causes the control unit 34 to reduce the initiation threshold value G1 to the lower initiation threshold value G1L. The initiation threshold value changing means 41 outputs a command signal which causes the control unit 34 to return the initiation threshold value G1 to the original value (the higher initiation threshold value G1H) when the brake pedal 26 is released, when the wheel speed deceleration falls below a predetermined value (e.g., 0.2 G) or when an acceleration of the wheel speed is detected.

Figure 3:
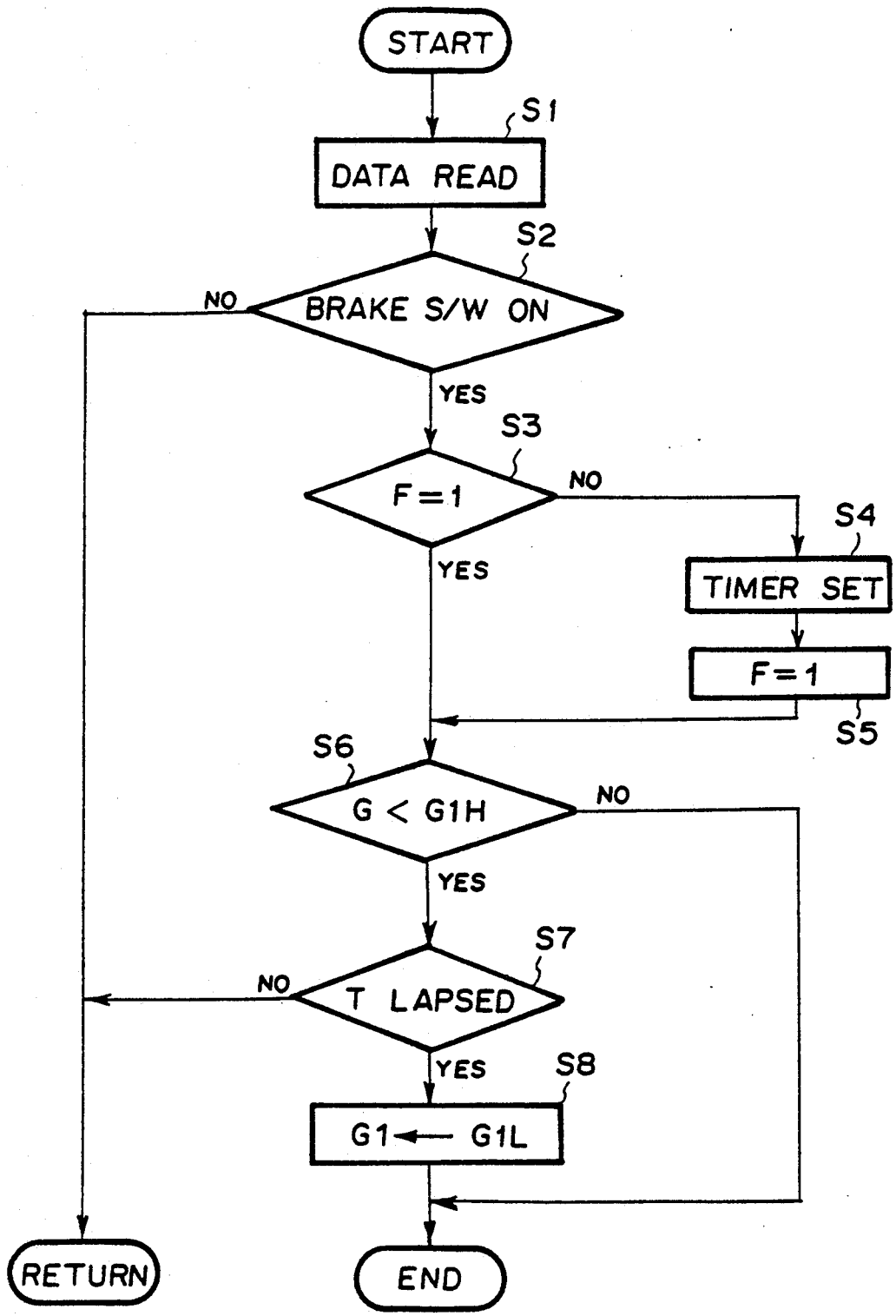

The change of the initiation threshold value G1 will be further described with reference to the flow chart shown in FIG. 3. Data such as the brake signal, the wheel speed signals and the like are read in step S1. At this time, the initiation threshold value G1 has been set to the higher value G1H. Then when the brake pedal 26 has been depressed (brake switch has been on), whether the deceleration G of the wheel speed is smaller than the higher initiation threshold value G1H is determined in step S6 after setting timer T for measuring the predetermined time T when it has not been set and then setting flag F to 1 (steps S3, S4 and S5). When the brake pedal 26 is kept depressed and the wheel speed is kept decelerated at a deceleration smaller than the higher initiation threshold value G1 until the predetermined time T lapses, the initiation threshold value changing means 41 outputs the command signal which causes the control unit 34 to reduce the initiation threshold value G1 to the lower initiation threshold value G1L. (steps S7 and S8)

Figure 4:
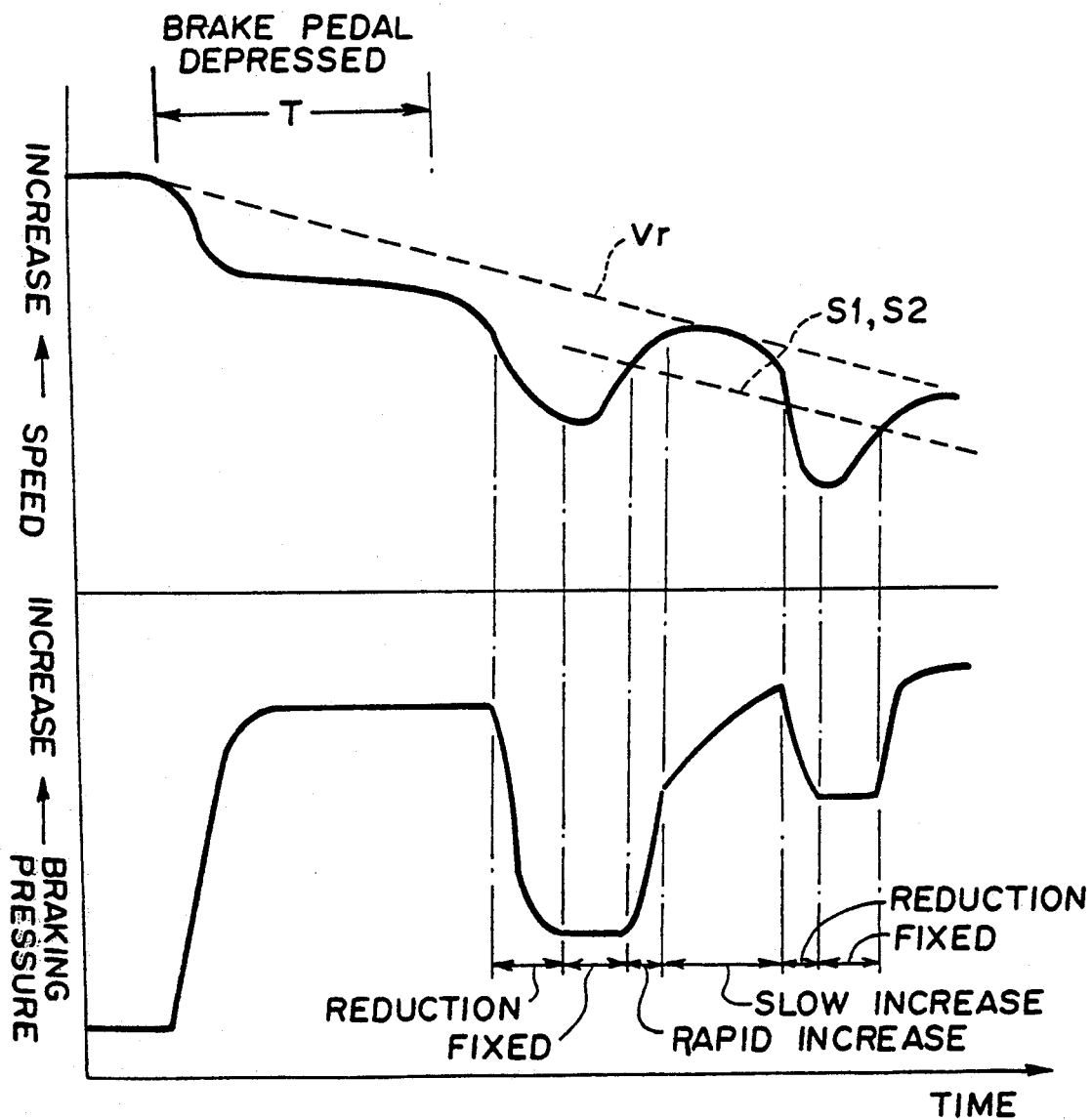

When the brake pedal 26 is kept depressed after sharply depressed and the wheel comes to tend to lock, the control unit 34 effects the antiskid control, for instance, in the manner shown in FIG. 4.

That is, when the brake pedal 26 is sharply depressed while the vehicle is cruising, the braking pressure produced by the master cylinder 28 increases rapidly, whereby and the wheel speed is reduced at a relatively large deceleration G until the slip ratio of the wheel reaches 10 to 20%. However since the initiation threshold value G1 has been set to the higher value G1H at this time, the antiskid control is not effected even the deceleration G is larger than the lower initiation threshold value G1L.

The deceleration G of the wheel speed is once reduced when the slip ratio of the wheel reaches 10 to 20% where the friction between the road surface and the wheel is maximized. When the predetermined time T lapses after depression of the brake pedal, the initiation threshold value G1 is reduced to the lower value G1L.

When the deceleration of the wheel speed subsequently exceeds the lower initiation threshold value G1, the control unit 34 selects phase-I and begins the antiskid control, that is, the braking pressure is reduced in a predetermined manner.

When the deceleration of the wheel speed becomes smaller than the wheel speed deceleration threshold value G2, the control unit 34 selects phase-II and fixes the braking pressure at the value at that time.

When the slip ratio is reduced in response to fixing of the braking pressure and becomes smaller than the first slip ratio threshold value S1, the control unit 34 selects phase-III and rapidly increases the braking pressure.

When the acceleration of the wheel speed decreases as a result of the rapid increase of the braking pressure and becomes not larger than the wheel speed acceleration threshold value G3, the control unit 34 selects phase-IV and slowly increases the braking pressure.

When the slip ratio exceeds the second slip ratio threshold value S2 while the braking pressure is slowly increased, the control unit 34 selects phase-I again.

In this manner, the control unit 34 increases and reduces the braking pressure for the first to third channels independently from each other and prevents locking or skid of each wheel, thereby stopping the vehicle in a short distance with a directional stability. When the brake pedal 26 is sharply depressed, the antiskid control is not initiated immediately in response to the depression of the brake pedal 26. That is, the braking pressure is not reduced immediately in response to the sharp depression of the brake pedal 26. Accordingly, the wheel speed is quickly is reduced to a level where the slip ratio is 10 to 20% and the friction between the road surface and the wheel is maximized, and an optimal braking effect can be obtained. When the slip ratio further increases, the antiskid control is immediately initiated and prevents locking or skid of the wheel. Further if the slip ratio does not increase, the antiskid control is not initiated. Accordingly, unnecessary initiation of the antiskid control can be avoided.

When the brake pedal is gently pushed down so that the wheel speed is reduced at about 0.2 G, which is the minimum deceleration so long as the braking pressure is applied to the wheel, the slip ratio generally reaches 10 to 20% in about 70 ms. Accordingly the predetermined ratio may be 70 ms or so.

After the vehicle runs at a deceleration of 0.2 G or so for a time longer than the predetermined time T, the slip ratio has reached 10 to 20% and accordingly there will arise no problem even if the initiation threshold value G1 is reduced to the lower initiation threshold value G1L.

Though, in the embodiment described above, the predetermined time T is a fixed time irrespectively of the wheel deceleration G, the predetermined time T may be shortened as the wheel deceleration G increases. With this arrangement, the antiskid control can be immediately initiated even the slip ratio increases immediately after the sharp depression of the brake pedal 26.

Further, though, in the embodiment described above, whether the wheel is applied with the braking pressure is determined on the basis of the output of the brake sensor 35, it may be determined on the basis of whether the wheel speed deceleration is larger than a predetermined value (e.g., 0.2 G).

When the vehicle is decelerated, fuel supply to one or more cylinders is normally cut and the torque converter of the automatic transmission is normally locked up as described above. However such fuel cut and lockup generally result in an engine brake effect to the rear wheels (driving wheels) and in slipping tendency thereof, and if the antiskid control is performed in such a state, the front wheels can slip intermittently independently from each other since the braking pressure to the left and right front wheels are separately controlled. That one of the front wheels tends to slip or lock while the rear wheels tend to slip is not preferable in preventing spin of the vehicle.

Accordingly, in this embodiment, the control unit 34 outputs a fuel cut inhibiting command to the cylinder number control system, a lockup inhibiting command to the lockup system and an opening command to the idle speed control valve in response to initiation of the antiskid control, whereby the engine brake effect is prevented from acting on the rear wheels and the driving force of the rear wheels is increased, thereby preventing spin of the vehicle.

To shift the automatic transmission into neutral or to upshift the same in response to initiation is also effective in avoiding the problem concerning the engine brake effect. Further, the inhibition of fuel cut may be performed only when the braking pressure is reduced or held at the reduced pressure (that is, when the wheel tends to lock).

What is claimed is:

1. An antiskid brake system for a vehicle comprising a hydraulic circuit for applying braking pressure to each wheel of the vehicle in response to depression of a brake pedal, a braking pressure control means for controlling the braking pressure applied to each wheel, a wheel speed detecting means for detecting wheel speeds of the wheels, and a control means for controlling the braking pressure control means to increase and reduce the braking pressure to each wheel so that the wheel speed of the wheel falls at a target deceleration or a target slip ratio when the deceleration of the wheel speed of the wheel of as detected by the wheel speed detecting means exceeds an initiation threshold value, and
an initiation threshold value changing means for reducing said initiation threshold value when the wheel is kept applied with the braking pressure for a predetermined time.

2. An antiskid brake system as defined in claim 1 wherein said predetermined time is about 70 ms.

3. An antiskid brake system as defined in claim 1 wherein whether the wheel is kept applied with the braking pressure is determined on the basis of whether the brake pedal is kept depressed.

4. An antiskid brake system as defined in claim 1 wherein whether the wheel is kept applied with the braking pressure is determined on the basis of whether the deceleration of the wheel speed is larger than a predetermined value.

5. An antiskid brake system for a vehicle comprising a hydraulic circuit for applying braking pressure to each wheel of the vehicle in response to depression of a brake pedal, a braking pressure control means for controlling the braking pressure applied to each wheel, a wheel speed detecting means for detecting wheel speeds of the wheels, and a control means for controlling the braking pressure control means to increase and reduce the braking pressure to each wheel so that the wheel speed of the wheel falls at a target deceleration or a target slip ratio when the deceleration of the wheel speed of the wheel of as detected by the wheel speed detecting means exceeds an initiation threshold value, and
an initiation threshold value changing means for reducing said initiation threshold value when the wheel is kept applied with the braking pressure and is decelerated at a deceleration smaller than the original initiation threshold value for a predetermined time.

6. An antiskid brake system for a vehicle comprising:
a hydraulic circuit for applying a braking pressure to each wheel of the vehicle in response to depression of a brake pedal;
a braking pressure control means for controlling the braking pressure applied to each wheel;
a wheel speed detecting means for detecting wheel speeds of the wheels;
a control signal supply means for supplying a control signal to the braking pressure control means so that the wheel speed of the wheel falls at a target deceleration or a target slip ratio; and
an activation means for activating the control signal supply means when one of:
(a) an actual deceleration of the wheel speed exceeds a first initiation threshed value; and
(b) the actual deceleration of the wheel sped exceeds a second initiation threshold value, which is smaller than the first initiation threshold value, after the braking pressure is continually applied to the wheel for a predetermined time; occurs.

7. An antiskid brake system as defined in claim 6 wherein said predetermined time is about 70 ms.

8. An antiskid brake system as defined in claim 6 wherein whether the wheel is kept applied with the braking pressure is determined on the basis of whether the brake pedal is kept depressed.

9. An antiskid brake system as defined in claim 6 wherein whether the wheel is kept applied with the braking pressure is determined on the basis of whether the deceleration of the wheel speed is larger than a predetermined value.

* * * * *